(12) United States Patent
Miyamoto et al.

(10) Patent No.: US 11,567,023 B2
(45) Date of Patent: Jan. 31, 2023

(54) MOLECULAR DETECTION APPARATUS AND MOLECULAR DETECTION METHOD

(71) Applicant: KABUSHIKI KAISHA TOSHIBA, Minato-ku (JP)

(72) Inventors: Hirohisa Miyamoto, Kamakura (JP); Yasushi Shinjo, Kawasaki (JP); Ko Yamada, Yokohama (JP); Mitsuhiro Oki, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 688 days.

(21) Appl. No.: 16/131,949

(22) Filed: Sep. 14, 2018

(65) Prior Publication Data

US 2019/0293588 A1  Sep. 26, 2019

(30) Foreign Application Priority Data

Mar. 22, 2018 (JP) .............................. JP2018-054668

(51) Int. Cl.
*G01N 27/12* (2006.01)
*G01N 21/64* (2006.01)

(52) U.S. Cl.
CPC ....... *G01N 27/125* (2013.01); *G01N 21/6428* (2013.01)

(58) Field of Classification Search
None
See application file for complete search history.

(56) References Cited

U.S. PATENT DOCUMENTS 8,367,419 B2    2/2013  Li et al.
2012/0040471 A1  2/2012  Chen et al.
(Continued)

FOREIGN PATENT DOCUMENTS

EP   3 208 597 A1   8/2017
JP      5404534       2/2014
(Continued)

OTHER PUBLICATIONS

Hu, Z., et al., "Selective, Sensitive, and Reversible Detection of Vapor-Phase High Explosives via Two-Dimensional Mapping: A New Strategy for MOF-Based Sensors", Crystal Growth & Design, 2013, vol. 13, pp. 4204-4207.
(Continued)

*Primary Examiner* — Lore R Jarrett
(74) *Attorney, Agent, or Firm* — Oblon, McClelland, Maier & Neustadt, L.L.P.

(57) ABSTRACT

A molecular detection apparatus of an embodiment includes: a first detector which includes a first sensor containing a MOF having a fluorescence emitting property, a light source which irradiates the MOF with light, and a light receiver which receives fluorescence from the MOF; a second detector which includes a sensor layer electrodes electrically connected with the sensor layer; and a type discrimination and concentration calculation part which discriminates a type of the molecules to be detected based on a measurement result measured by the first detector, and calculates a concentration of the molecules a measurement result measured by the second detector based on a discrimination result of a type of the molecules.

17 Claims, 7 Drawing Sheets

(56) References Cited

U.S. PATENT DOCUMENTS

| | | | |
|---|---|---|---|
| 2014/0309947 A1* | 10/2014 | Gryska | G01N 27/227 702/27 |
| 2015/0323482 A1 | 11/2015 | Shimoyama et al. | |
| 2015/0364340 A1 | 12/2015 | Ueda | |
| 2016/0123919 A1 | 5/2016 | Johnson et al. | |
| 2017/0044428 A1* | 2/2017 | Li | C07F 3/003 |
| 2017/0218162 A1 | 8/2017 | Walker | |
| 2017/0248565 A1 | 8/2017 | Yamada et al. | |
| 2017/0248566 A1 | 8/2017 | Yamada et al. | |
| 2018/0003604 A1 | 1/2018 | Shiba et al. | |
| 2018/0059053 A1 | 3/2018 | Yamada et al. | |
| 2018/0080911 A1 | 3/2018 | Yamada et al. | |

FOREIGN PATENT DOCUMENTS

| | | |
|---|---|---|
| JP | 2017-156346 | 9/2017 |
| JP | 2018-048823 A | 3/2018 |
| WO | WO 2009/017882 A1 | 2/2009 |
| WO | WO 2011/154939 A1 | 12/2011 |
| WO | WO 2014/104156 A1 | 7/2014 |
| WO | WO 2016/012755 A1 | 1/2016 |
| WO | WO 2016/121155 A1 | 8/2016 |
| WO | WO 2016/195080 A1 | 12/2016 |
| WO | WO 2017/042851 A1 | 3/2017 |
| WO | WO 2017/098862 A1 | 6/2017 |

OTHER PUBLICATIONS

Sakata, Y., et al., "Shape-Memory Nanopores Induced in Coordination Frameworks by Crystal Downsizing", Science, vol. 339, Jan. 11, 2013, pp. 193-196 with cover page.

* cited by examiner

MOLECULAR DETECTION APPARATUS AND MOLECULAR DETECTION METHOD

CROSS REFERENCE TO RELATED APPLICATION

This application is based upon and claims the benefit of priority from Japanese Patent Application No. 2018-054668, filed on Mar. 22, 2018; the entire contents of which are incorporated herein by reference.

FIELD

Embodiments described herein generally relate to a molecular detection apparatus and a molecular detection method.

BACKGROUND

In recent years, global environmental problems due to an air pollution have become obvious, and in the context of tightening of regulations on emission gases from plants and vehicles, a gas detection apparatus has been required to be highly sensitive. In terms of an environmental standard related to the air pollution, for example, 40 ppb (parts per billion) or less has served as a standard for $NO_X$ (nitrogen oxide), and thus, detecting an extremely small amount of gas component in the order of ppb has been required. Separately from the environmental problems, in the defense field, development of accurate and rapid analytical methods with respect to NBC (N: Nuclear, B: Biological, C: Chemical) substances has stood as an issue. In terms of chemical agents in particular, rapid sensing of toxic gas that has an extremely strong effect on human body has been required as seen in the sarin nerve-gas attack on the Tokyo subway system. In order to prevent secondary damage, it is necessary to detect a gas component having an extremely low concentration in real time. Although various methods have been known as a method of detecting a gas component having a relatively high concentration, the detection methods have been limited for detecting the gas component having a concentration of ppb (parts per billion) to ppt (parts per trillion), which corresponds to an extremely low concentration.

For example, at a disaster site, a site at which an act of terrorism occurs, a site for quarantine at the border, or the like, it has been desired to sense the risk in advance by detecting an extremely small amount of the gas component. The gas component having an extremely low concentration is often detected by use of large equipment in research facilities. In this case, installation type equipment, which is expensive and has large weight and volume, is required such as a gas chromatography or a mass spectrometer. The case where direct measurement is desired on the go relies on a simple measurement method that detects the gas component by use of a biological reaction mechanism, but has many problems of a storage life, temperature management, a limit of determination whether the gas component is present or not, and the like. Under such circumstances, an apparatus that is capable of detecting the gas component having an extremely low concentration in real time, in other words, an apparatus that has a smaller weight and volume and a better portability and enables selective and higher sensitive detection of the gas component having an extremely low concentration in the order of ppt to ppb has been required.

As a detection element for the gas component having a low concentration, for example, an element has been known that has a conductive layer in which a surface of a carbon substrate such as a carbon nanostructure or graphene is surface modified with an organic substance or the like which selectively reacts with or adsorbs a specific substance and measures a potential difference or the like which changes depending on the gas component that has adhered to the surface of the carbon nano substrate. For example, when a component or the like similar to a detection target gas component is mixed, as an impurity, in a gas obtained from the air, such a detection element has a risk of being incapable of accurately detecting the detection target gas component. An inaccurate detection result of the detection target gas component naturally results in inaccurate concentration detection thereafter as well. Therefore, a detection apparatus capable of selectively and highly sensitively detecting the gas component having an extremely low concentration has been required.

DETAILED DESCRIPTION

A molecular detection apparatus of an embodiment includes: a first detector which includes a first sensor containing a metal organic framework having a fluorescence emitting property, a light source to irradiate the metal organic framework with light, and a light receiver to receive fluorescence from the metal organic framework, and measures a fluorescence property of the metal organic framework which changes according to molecules to be detected; a second detector which includes a second sensor having a sensor layer and electrodes electrically connected with the sensor layer, and measures an electric property of the sensor layer which changes according to the molecules; and a type discrimination and concentration calculation part which discriminates a type of the molecules by a measurement result of the fluorescence property measured with the first detector, and calculates a concentration of the molecules by a measurement result of the electric property measured with the second detector based on a discrimination result of the type of molecules.

Hereinafter, a molecular detection apparatus and a molecular detection method according to embodiments will be explained with reference to the drawings. Note that in each embodiment, substantially the same constituent elements are denoted by the same reference signs and an explanation thereof will be omitted in some cases. The drawings are schematic, and a relation of the thickness and the planar dimension of each unit, a thickness ratio of each unit, and so on may differ from actual ones in some cases.

First Embodiment

Figure 1:
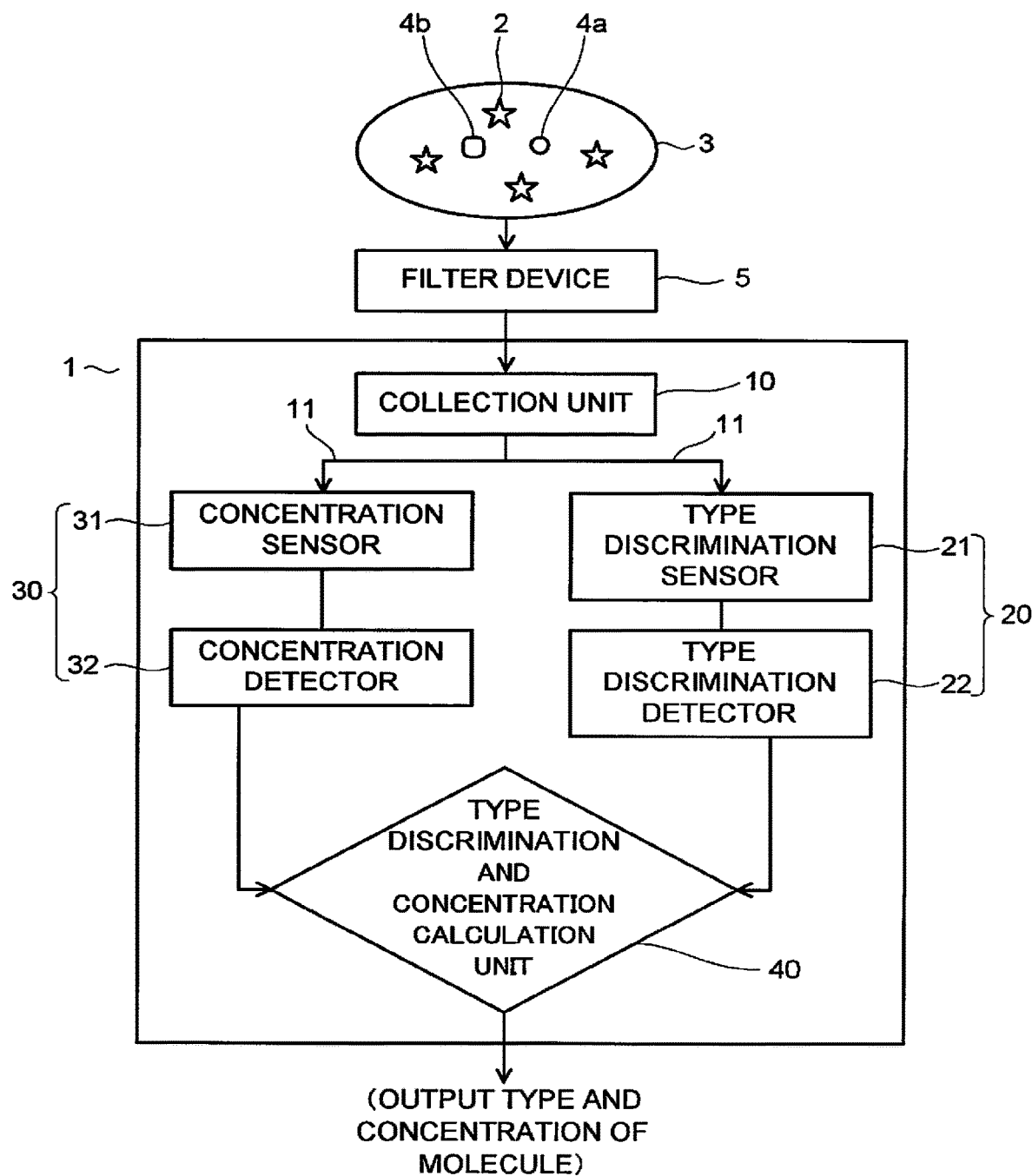
FIG. 1 is a block diagram illustrating a molecular detection apparatus of a first embodiment.

FIG. 1 is a block diagram illustrating a molecular detection apparatus of a first embodiment. A molecular detection apparatus 1 illustrated in FIG. 1 is, for example, an apparatus which detects a molecule to be detected 2 from a detection target gas 3 containing the molecules to be detected (substances to be detected) 2 and calculates a type (molecular type/speciation) and a concentration of the molecule to be detected 2, and includes a collection unit (also referred to as a collector) 10, a type detection unit (also referred to as a first detector) 20, a concentration detection unit (also referred to as a second detector) 30, and a type discrimination and concentration calculation unit (also referred to as a type discrimination and concentration calculation part) 40. In a previous stage of the molecular detection apparatus 1 illustrated in FIG. 1, a filter device 5 is installed as a pretreatment device. The pretreatment device of the molecular detection apparatus 1 is not limited to the filter device 5, and depending to a state of the molecule to be detected 2 or the detection target gas 3 containing the molecules to be detected 2, various pretreatment devices which are used for treatment of typical gas components are applicable.

The detection target gas 3 sometimes contains, as an impurity, substances having a molecular weight, a molecular structure, or the like similar to that of the molecule to be detected 2. Further, the molecules to be detected 2 drifting in the air often exist in a state where the molecules to be detected 2 are mixed with various foreign substances 4 (4a and 4b) such as an odor component and a fine particle. The detection target gas 3 may be sent to the molecular detection apparatus 1 after being pretreated by the filter device 5 or the like beforehand. For the filter device 5, a typical moderate-to-high performance filter or the like is used. In the filter device 5, the impurity such as fine particles contained in the detection target gas 3 is removed. Note that the filter device 5 is installed as necessary, and the detection target gas 3 containing the molecules to be detected 2 may be directly collected by the collection unit 10 of the molecular detection apparatus 1.

The detection target gas 3 containing the molecules to be detected 2 is collected directly by the collection unit 10, or is collected by the collection unit 10 after being pretreated by the filter device 5 or the like. The collection unit 10 has a collection port for the detection target gas 3, and is connected with the type detection unit 20 and the concentration detection unit 30 via gas flow paths 11. The molecules to be detected 2 collected by the collection unit 10 are sent to each of the type detection unit 20 and the concentration detection unit 30 via the gas flow paths 11. The type detection unit 20 detects a type (molecular type) of the molecule to be detected 2. The concentration detection unit 30 detects a concentration of the molecule to be detected 2. Here, the detection of the type (molecular type) of the molecule to be detected 2 means that based on a molecular weight, a molecular structure, or the like of the molecule to be detected 2, a type (chemical type) of the molecule to be detected 2 (speciation of the molecule) as a chemical compound is specified.

Figure 2:
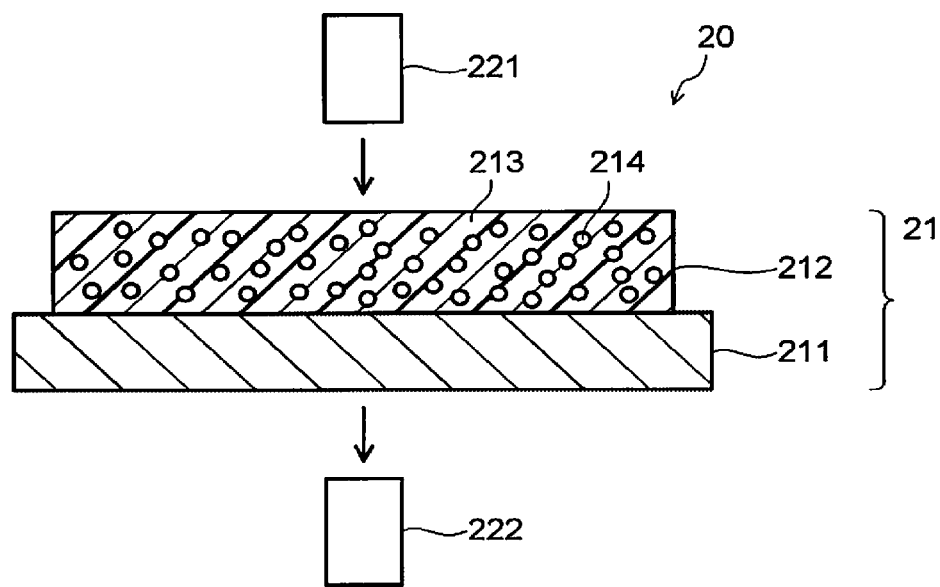
FIG. 2 is a view illustrating a configuration of a type detection unit in the molecular detection apparatus of the first embodiment.

The type detection unit 20 has a type discrimination sensor (also referred to as a first sensor) 21 and a type detector 22. The molecules to be detected 2 collected by the collection unit 10 are introduced to the type discrimination sensor 21. As illustrated in FIG. 2, the type discrimination sensor 21 includes a substrate 211 and a phosphor layer 212 provided on the substrate 211. The phosphor layer 212 has a transparent resin 213 such as a silicone resin and a metal organic framework (MOF) 214 dispersed in the transparent resin 213. For the phosphor layer 212, the MOF 214 which exhibits a fluorescence emitting property when it is excited by light is used.

Figure 7:
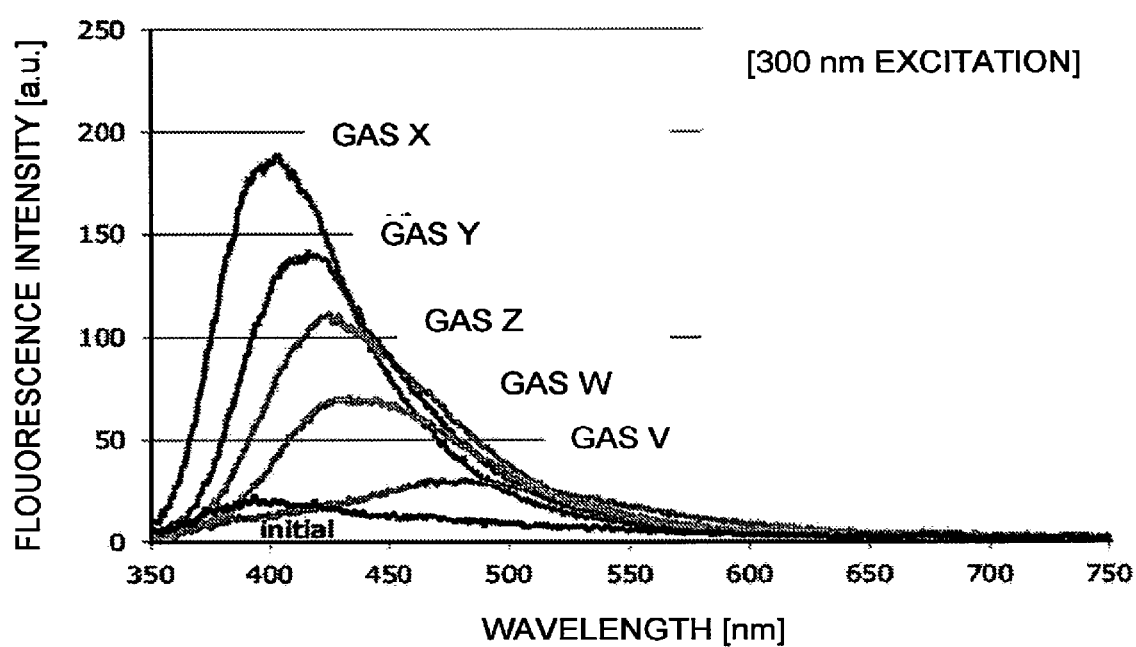
FIG. 7 is a chart illustrating one example of measurement results of the type detection unit illustrated in FIG. 6.

As illustrated in FIG. 2, the type detection unit 20 includes a light source 221 which irradiates the phosphor layer 212 containing the MOF 214 having the fluorescence emitting property with light and a light receiver 222 which receives fluorescence emitted from the MOF 214 excited by the light from the light source 221. When the MOF 214 having the fluorescence emitting property is excited by the light from the light source 211, by an interaction with the molecule to be detected 2 which the transparent resin 213 such as the silicone resin has transmitted, a fluorescence property is changed. When the MOF 214 absorbs or captures the molecule to be detected 2, according to the type (molecular type) of the molecule to be detected 2, as illustrated in FIG. 7, a spectrum shape of a fluorescence spectrum of the MOF 214 changes, and further, a time change rate of fluorescence intensity at a specific wavelength of the fluorescence spectrum changes.

For example, since the fluorescence spectrum of the MOF 214 exhibits a specific spectrum shape according to the molecule to be detected 2 absorbed or captured by the MOF 214, the type of the molecule to be detected 2 absorbed or captured by the MOF 214 can be specified from the spectrum shape. A time change of the fluorescence intensity at the specific wavelength in the fluorescence spectrum is also similar, and after exciting the MOF 214 by the light from the light source 221, a rate of a change in the fluorescence intensity (time change rate of quenching) indicates a specific value according to the molecule to be detected 2, and therefore, the type of the molecule to be detected 2 absorbed or captured by the MOF 214 can be specified from the spectrum shape. Thus, measuring the fluorescence property of the MOF 214 absorbing or capturing the molecule to be detected 2 makes it possible to specify the type of the molecule to be detected 2 by using the type detection unit 20 having the type discrimination sensor 21.

The type discrimination sensor 21 can be formed to be attachable and detachable as necessary. The substrate 211 of the type discrimination sensor 21 is not particularly limited, but when the fluorescence of the MOF 214 is received by the light receiver 222 installed on a side opposite to the light source 221, a transparent substrate made of glass, a transparent resin, a transparent oxide, or the like is used. Further, applying the substrate 211 having a transparent conductive film such as ITO (Indium Tin Oxide) and adding a structure allowing the transparent conductive film to be heated by passing electricity therethrough (heating mechanism) allow desorption of the molecules to be detected 2 absorbed or adhering to the phosphor layer 212 and repeated use of the type discrimination sensor 21.

For the phosphor layer 211 of the type discrimination sensor 21, the MOF 214 having the fluorescence emitting property is used as described above. The MOF is a composition containing metal ions and an organic ligand in general, and the one having the fluorescence emitting property among such compositions is used for the phosphor layer 212. The metal ion is not particularly limited, but for example, there can be cited a zirconium ion ($Zr^{2+}$), an aluminum ion ($Al^{3+}$), an iron ion ($Fe^{3+}$), a cobalt ion ($Co^{2+}$), a nickel ion ($Ni^{2+}$), a copper ion ($Cu^{2+}$), a zinc ion ($Zn^{2+}$), a cadmium ion ($Cd^{2+}$), and so on.

As the organic ligand of the MOF, for example, a tetradentate ligand and a bidentate ligand are known. The organic ligand forming the MOF 21 may be either of them, and further, may be the one forming a pillared layer structure with the bidentate ligand and the bidentate ligand or the tetradentate ligand and the bidentate ligand. As the tetradentate ligand, for example, there can be cited terephthalic acid, 2-aminoterephthalic acid, 2,6-naphthalenedicarboxylic acid, 4,4-biphenyldicarboxylic acid, 9,10-anthracene dicarboxylic acid, 2,6-anthracene dicarboxylic acid, 9,10-bis(4-carboxyphenyl)anthracene, 2,7-pyrenedicarboxylic acid, 9-fluorene-2,7-dicarboxylic acid, 9-fluorenone-2,7-dicarboxylic acid, 4,4'-stilbenedicarboxylic acid, and so on. As the bidentate ligand, there can be cited triethylenediamine, 4,4'-bypyridyl, 1,4-di(4-pyridyl)benzene, 3,6-di(4-pyridyl)-1,2,4,5-tetrazine, 1,2-di(4-pyridyl)ethane, 1,2-di(4-pyridyl)ethylene, 1,4-bis[(1H-imidazole-1-yl)methyl]benzene, and so on.

In the type detection unit 20, an emission wavelength of the light source 221 which excites the phosphor layer 212 is appropriately selected according to a configuration of the phosphor layer 212, for example, the type of the MOF 214 or the like. As the light source 211, for example, a light emitting device using semiconductors such as various LEDs (Light Emitting Diode) or LDs (Laser Diode), or another light emitting device is used. The light source 221 may be the one which directly irradiates the phosphor layer 212 with light, or may be the one which indirectly irradiates it with light via an optical fiber or the like.

As the light receiver 222, for example, a single photodiode, a CMOS image sensor in which photodiodes, MOSFETs, wiring, and the like are fabricated on a silicon substrate by using a well known ion implantation technology, film-forming technology, or the like, a SiPM sensor, or the like is used. For the light receiver 222, the one having a photoelectric conversion function in which an electrical signal is outputted based on received light is used. The light receiver 222 may be the one which directly receives light from the MOF 214 or may be the one which indirectly receives the light via the optical fiber or the like. Further, in order to prevent the light of the light source 221 from being transmitted through the phosphor layer 212 and being detected, UV cut glass may be interposed between the light source 221 and the light receiver 222, or the light of the light source 221 may be completely blocked by disposing a sliding shutter. When a point light source such as an LED light source is used, a diffusion plate or the like may be disposed between the light source 221 and the phosphor layer 212 to expand a range where the phosphor layer 212 is irradiated with the light.

Furthermore, the type detector 22 has a signal processing unit which processes the electrical signal outputted from the light receiver 222 as necessary and sends it to the type discrimination and concentration calculation unit 40, a control unit which controls operation of the type discrimination sensor 21 or the type detector 22, and the like. The electrical signal (detection signal) corresponding to the spectrum shape and the time change rate of the fluorescence intensity at the specific wavelength in the fluorescence spectrum of the MOF 214, and the like is processed as necessary and sent to the type discrimination and concentration calculation unit 40. The signal processing unit and the control unit may be formed by hardware using, for example, a processor or the like. Further, they may be the ones which collectively process and control signal processing and operation of the molecular detection apparatus 1 including signal processing units, control units, and the like of the concentration detection unit 30 and the type discrimination and concentration calculation unit 40.

Figure 3:
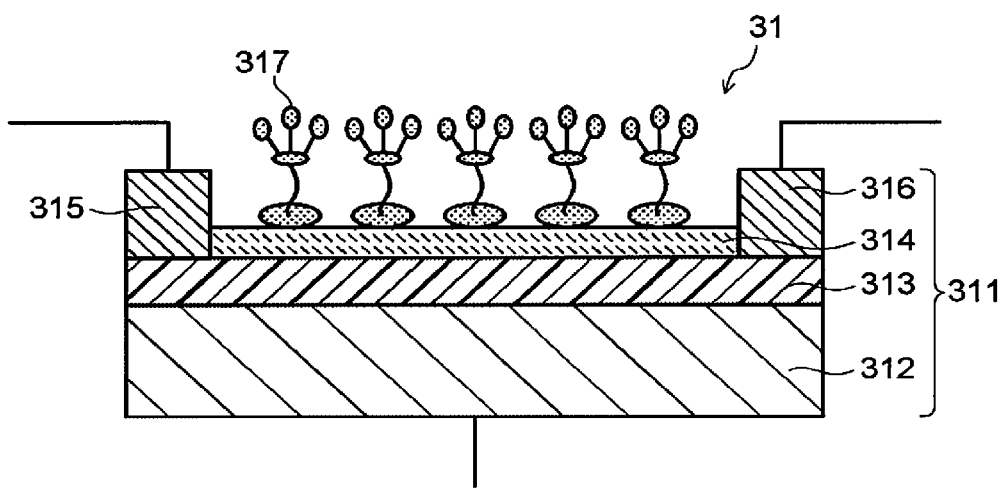
FIG. 3 is a view illustrating a configuration of a concentration detection unit in the molecular detection apparatus of the first embodiment.

The concentration detection unit 30 has a concentration sensor (also referred to as a second sensor) 31 and a concentration detector 32. The molecules to be detected 2 collected by the collection unit 10 are introduced to the concentration sensor 31. As illustrated in FIG. 3, the concentration sensor 31 includes a back-gated graphene FET (GFET) 311. The GFET 311 has a semiconductor substrate 312 which functions as a gate electrode, an insulating film 313 provided as a gate insulating layer on the semiconductor substrate 312, a graphene layer 314 provided as a channel on the insulating film 313, a source electrode 315 provided at one end of the graphene layer 314, and a drain electrode 316 provided at the other end of the graphene layer 314. On the graphene layer 314, organic probes 317 which absorb the molecules to be detected 2 selectively are provided.

The molecules to be detected 2 which are led onto the concentration sensor 31 are captured by the organic probes 317 on the graphene layer 314. Electrons are moved from the molecules to be detected 2 captured by the organic probes 317 to the GFET 311, thereby performing electric detection. However, the organic probes 317 are provided as necessary, and installation thereof may be omitted. In that case, the graphene layer 314 may be used for a sensor layer which the electric property changes according to the molecules to be detected 2. In place of the graphene layer 314, carbon nanotubes and carbon nanowires may be used for a sensor layer. Further, in place of the GFET 311 having the graphene layer 314, a semiconductor sensor using a metal oxide such as $SnO_2$, $In_2O_3$, $ZnO$, and $Fe_2O_3$ may be used for the concentration sensor 31. The semiconductor sensor has a metal oxide layer (sensor layer) and electrodes electrically connected with the metal oxide layer. The concentration sensor 31 may include a sensor layer which the electric property changes according to the molecules to be detected 2 and electrodes electrically connected with the sensor layer. A second embodiment described below is similar, too.

When the molecules to be detected 2 are captured by the organic probes 317 provided on the graphene layer 314, an output from the GFET 311 changes. Because there is zero gap in a case of a single layer of graphene, the source electrode 315 and the drain electrode 316 are continuously electrified normally. When the number of graphene layers increases to two or three layers, a band gap is generated, but a band gap in an actual system is relatively smaller than that considered from a strict theoretical value. When the gate insulating layer 313 has a dielectric constant approximately similar to that of a silicon dioxide film, the source electrode 315 and the drain electrode 316 are often continuously electrified. Thus, the graphene layer 314 may be formed of a stack composed of about five graphene layers or less as well as the single layer structure of graphene.

Figure 9:
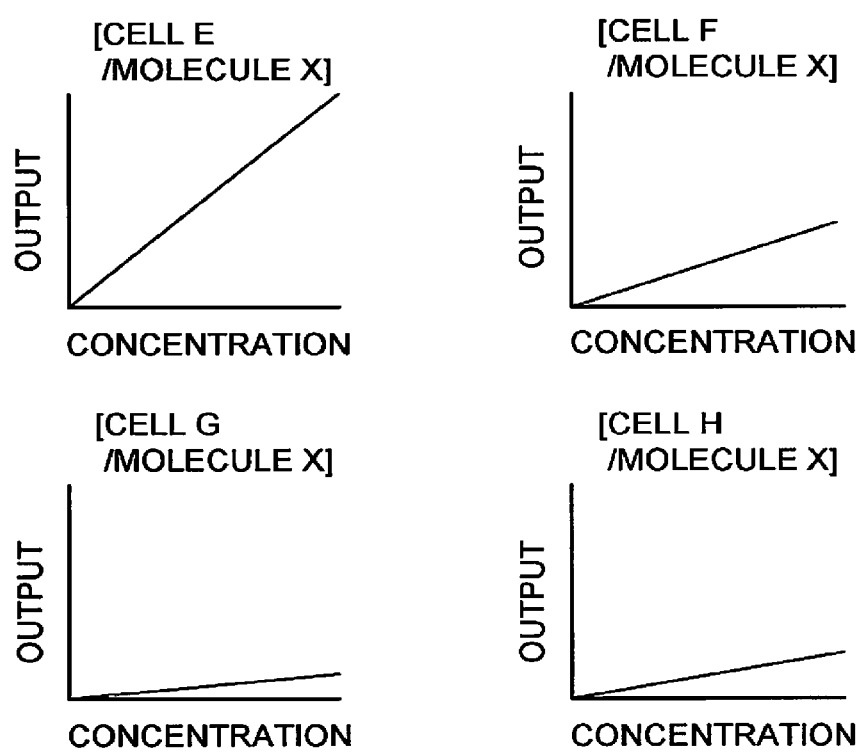
FIG. 9 is charts illustrating one example of measurement results of the concentration detection unit illustrated in FIG. 8.
Figure 10:
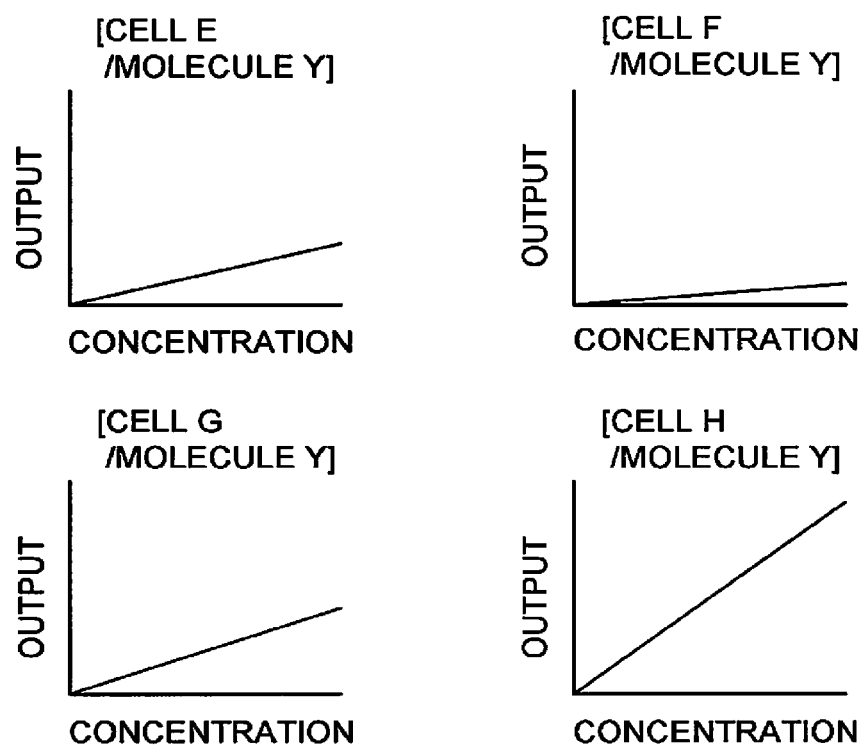
FIG. 10 is charts illustrating the other example of measurement results of the concentration detection unit illustrated in FIG. 8.

The molecule to be detected 2 flying in the vicinity of the organic probe 317 is attracted to the organic probe 317 by hydrogen bonding force or the like, and further comes into contact therewith. When the contact with the molecule to be detected 2 occurs, an interchange of electrons occurs between the organic probe 317 and the molecule to be detected 2, and the organic probe 317 transmits an electrical change to the graphene layer 314 being in contact therewith. The electrical change transmitted from the organic probe 317 to the graphene layer 314 disturbs the flow of electricity between the source electrode 315 and the drain electrode 316, and thus the GFET 311 functions as a sensor. As illustrated in FIG. 9 and FIG. 10, the electrical change transmitted from the organic probe 317 to the graphene layer 314 indicates, for example, a positive correlation or a negative correlation with respect to the concentration of the molecule to be detected 2 absorbed to the organic probe 317. Accordingly, finding the electrical change with respect to the concentration of the molecule to be detected 2 in advance makes it possible to find the concentration of the molecule to be detected 2 from an electrical signal (detection signal) of the GFET 311.

The electrical signal of the GFET 311 changes according to the bonding force between the organic probe 317 and the molecule to be detected 2. Using the organic probe 317 having strong bonding force with the molecule to be detected 2 allows selective detection of the molecule to be detected 2, and further, allows an electrical change amount of the GFET 311 with respect to the concentration of the molecule to be detected 2 to be made larger. Accordingly, it is possible to more accurately measure the concentration of the molecule to be detected 2. As described above, note that FIG. 3 illustrates the GFET 311 having the organic probes 317 provided on the graphene layer 314, but the organic probe 317 is provided as necessary, and installation thereof may be omitted. In that case, by measuring an electric property of the GFET 311 which changes due to absorption of the molecule to be detected 2 to the graphene layer 314, the concentration of the molecule to be detected 2 is detected.

The organic probe 317 is not particularly limited, and for example, an organic compound having such a reactive group as reacts with the molecule to be detected 2 to generate an exchange of electrons is used. For the organic probe 317, for example, the organic compound having a hydroxy group (—OH), an amino group (—NH$_2$), a cyano group (—CN), or the like is used as the reactive group with respect to the molecule to be detected 2. However, only the reactive group hardly reacts with a gas component in some cases. In such cases, in order to enhance a hydrogen bonding property or the like, an organic compound in which a functional group (neighboring group) excellent in an inductive effect of the molecule to be detected 2 has been introduced into a portion adjacent to the reactive group is preferably used.

As the neighboring group with respect to the reactive group, there can be cited a fluorinated alkyl group such as a trifluoromethyl group (—CF$_3$) or a hexafluoroethyl group (—C$_2$F$_5$), a functional group containing nitrogen such as a cyano group (—CN), a nitro group (—NO$_2$), or a —CHN group, and an alkyl group such as a methyl group (—CH$_3$) or an ethyl group (—C$_2$H$_5$). The organic compound forming the organic probe 317 preferably has a head portion having an organic group containing the reactive group such as the hydroxy group or the amino group and the above-described neighboring group, a base portion serving as an installation portion with respect to the graphene layer 314 or the like, and a connecting portion connecting the head portion and the base portion.

The base portion is preferably a substituted or unsubstituted polycyclic aromatic hydrocarbon group having a polycyclic structure such as a pyrene ring, an anthracene ring, a naphtacene ring, or a phenanthrene ring, and further, more preferably a substituted or unsubstituted pyrene group. The connecting portion is a single bond or an organic group. As the organic group forming the connecting portion, there can be cited a substituted or unsubstituted alkylene group such as a methylene group or an ethylene group, an ether bond (—O—), an ester bond (—C(=O)O—), a carbonyl bond (—CO—), an amide bond (—NH—CO—), an imide bond (—CO—NH—CO—) or the like, or a substituted or unsubstituted alkylene group containing the above.

The organic probe 317 may be formed by installing one type of organic compound on the graphene layer 314, or may be formed by installing a mixture of two or more types of organic compounds on the graphene layer 314. In the organic compound forming the above-described organic probe 317, the bond strength of the organic probe 317 with the molecule to be detected 2 can be adjusted according to the type of reactive group, the type of neighboring group with respect to the reactive group, the number of them, or the like. Accordingly, installing the mixture of two or more types of organic compounds on the graphene layer 314 allows an adjustment of an electrical change amount of the GFET 311 with respect to the concentration of the molecule to be detected 2. In other words, providing a plurality of types of organic probes 317 whose mixing ratios have been changed on the graphene layer 314 makes it possible to arbitrarily obtain the bond strength with the molecule to be detected 2 and the electrical change amount based thereon.

As a method of providing the organic probe 317 on the graphene layer 314, for example, a solution method indicated below is applicable. That is, because the organic compound forming the organic probe 317 has a property of dissolving in a solvent, dissolving the organic compound to create a solution and applying such a solution allows installation of the organic probes 317 on the graphene layer 314. In applying the solution method and providing the organic probes 317 on the graphene layer 314, the organic probe 317 preferably includes a portion (base portion) having such a structure as a pyrene ring in order to easily obtain an interaction with graphene. A molecule having such a structure as a pyrene ring has an interaction with a hexagonal π-electron system formed by carbon of the graphene, and forms an interaction state of what is called π-π stacking. Low-concentration probe molecules are dissolved in a solvent and the resultant is applied to the graphene, and thereby the π-π stacking is formed between the pyrene ring and the graphene and the probe molecules are aligned on the graphene to be fixed.

The concentration detector 32 has a signal processing unit which processes the electrical signal outputted from the concentration sensor 31 as necessary and sends it to the type discrimination and concentration calculation unit 40, a control unit which controls operation of the concentration sensor 31 or the concentration detector 32, and the like. For example, an output signal of the GFET 311 which changes due to absorption of the molecule to be detected 2 to the organic probe 317 or the graphene layer 314, for example, an electrical signal corresponding to a drain current value, a change in conductivity of the gate electrode 312, or the like is processed as necessary and sent to the type discrimination and concentration calculation unit 40. The signal processing unit and the control unit may be formed by hardware using, for example, a processor or the like.

The signals detected by the type detection unit 20 and the concentration detection unit 30 are sent to the type discrimination and concentration calculation unit 40. The type discrimination and concentration calculation unit 40 has a storage unit which stores a signal value corresponding to the spectrum shape and the time change rate of the fluorescence intensity at the specific wavelength in the fluorescence spectrum of the MOF 214 for each molecule to be detected 2, and the like, an output signal value of the GFET 311 for each molecule to be detected 2, and a concentration corresponding to the output signal value, a discrimination and calculation unit which compares the signals sent from the type detection unit 20 and the concentration detection unit 30 with signal values stored in the storage unit, and a control unit which controls operation of each of these units. The signal value of the MOF 214 and the output signal value of the GFET 311 are signal-processed by the type discrimination and concentration calculation unit 40.

In the type discrimination and concentration calculation unit 40, first, the signal sent from the type detection unit 20 is compared with a signal of the MOF 214 stored in the storage unit to discriminate the type (molecular type) of the molecule to be detected 2. Next, based on a discrimination result of the type of the molecule to be detected 2, a correlation between the output signal value of the GFET 311 and the concentration corresponding to the molecule to be detected 2 is selected, and the output signal value of the GFET 311 is converted into the concentration based thereon, thereby calculating the concentration of the molecule to be detected 2. This is because the output signal value of the GFET 311 sometimes changes depending on the molecule to be detected 2, and in order to calculate the concentration of the molecule to be detected 2 more accurately, the concentration is calculated from the correlation between the output signal value of the GFET 311 and the concentration corresponding to the molecule to be detected 2. Then, the type and the concentration of the molecule to be detected 2 are outputted.

According to the molecular detection apparatus 1 of the first embodiment, since the type of the molecule to be detected 2 is discriminated based on the spectrum shape and the time change rate of the fluorescence intensity at the specific wavelength in the fluorescence spectrum of the MOF 214, and the like, discrimination accuracy for the molecule to be detected 2 can be simply increased. In line therewith, since the correlation between the output signal value of the GFET 311 and the concentration is selected based on the discrimination result of the molecule to be detected 2 and the concentration of the molecule to be detected 2 is calculated based thereon, accuracy for the concentration can also be increased. These make it possible to provide the molecular detection apparatus 1 capable of selectively and highly sensitively performing molecular recognition and concentration calculation of a gas component. Furthermore, since the type detection unit 20 and the concentration detection unit 30 react with a gas component having an extremely low concentration, it becomes possible to selectively and highly sensitively perform molecular recognition and concentration calculation of the gas component having the extremely low concentration.

Second Embodiment

Next, a molecular detection apparatus of a second embodiment will be explained with reference to FIG. 4 and FIG. 5. The molecular detection apparatus of the second embodiment includes a collection unit 10, a type detection unit 20, a concentration detection unit 30, and a type discrimination and concentration calculation unit 40 similarly to the molecular detection apparatus 1 illustrated in FIG. 1. The molecular detection apparatus of the second embodiment is different in a configuration of a type discrimination sensor 21 of the type detection unit 20 and a configuration of a concentration sensor 31 of the concentration detection unit 30 from that of the first embodiment. Other than the configurations of the type detection unit 20 and the concentration detection unit 30 described in detail below, the second embodiment is the same as the first embodiment.

Figure 4:
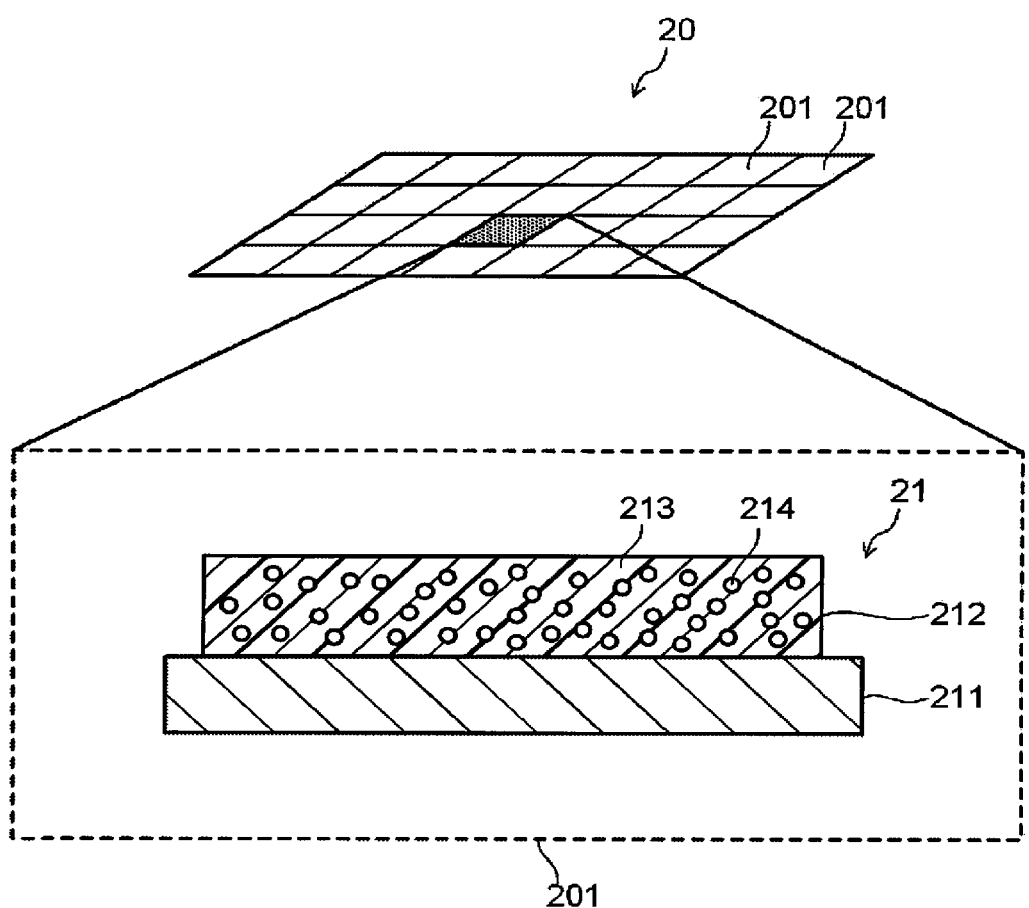
FIG. 4 is a view illustrating a configuration of a type detection unit in a molecular detection apparatus of a second embodiment.

FIG. 4 illustrates the type discrimination sensor 21 of the type detection unit 20 in the molecular detection apparatus of the second embodiment. The type detection unit 20 includes a plurality of type detection cells 201, 201, and the type discrimination sensor 21 is provided for each of the type detection cells 201, 201. The type discrimination sensors 21 in these type detection cells 201, 201 have MOFs 214 different from each other. That is, the type detection unit 20 has a plurality of MOFs 214. Note that a configuration of the type discrimination sensor 21 having the MOF 214 is the same as that of the first embodiment.

Not only a change in a fluorescence property of the MOF 214 differs depending on the molecule to be detected 2, but also the fluorescence property with respect to the molecule to be detected 2 also sometimes changes depending on a type of the MOF 214. Accordingly, detecting in which the fluorescence property of the MOF 214 of the type detection cell 201 of the type detection unit 20 reacts with the molecule to be detected 2 and detecting the fluorescence property of the MOF 214 in the specified type detection cell 201 allow an increase in detection accuracy for the molecule to be detected 2, and further, allow a plurality of molecules to be detected 2 to be detected by one type detection unit 20. In addition, the MOFs 214 in the plurality of type detection cells 201, 201 also sometimes react with the molecule to be detected 2, and on the occasion of the above, the molecule to be detected 2 can also be discriminated by patterning changes in fluorescence property from the plurality of type detection cells 201, 201. In any case, discrimination accuracy for the molecule to be detected 2 can be increased.

Figure 5:
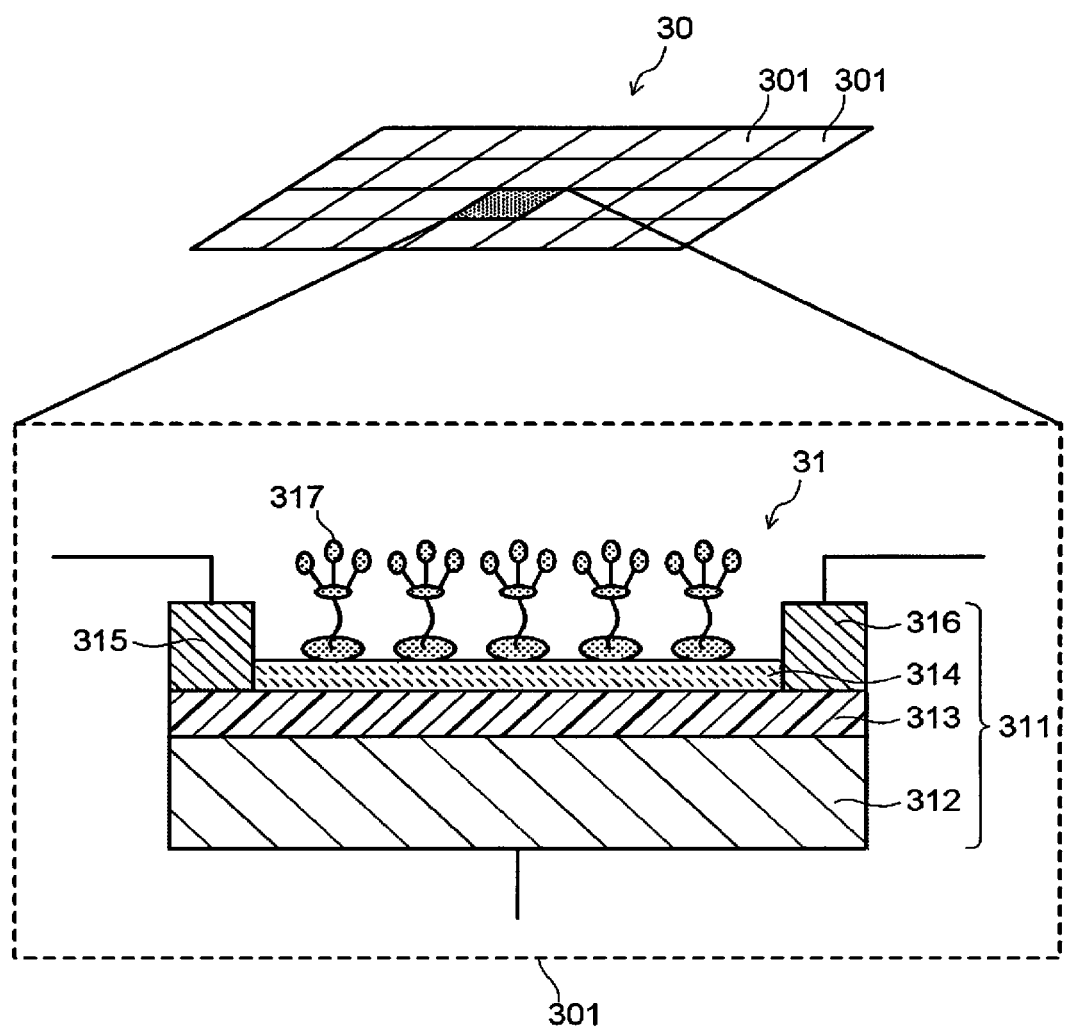
FIG. 5 is a view illustrating a configuration of a concentration detection unit in the molecular detection apparatus of the second embodiment.

FIG. 5 illustrates the concentration sensor 31 of the concentration detection unit 30 in the molecular detection apparatus of the second embodiment. The concentration detection unit 30 includes a plurality of concentration detection cells 301, 301, and the concentration sensor 31 is provided for each of the concentration detection cells 301, 301. In the concentration sensors 31 of these concentration detection cells 301, 301, the GFETs 311 have organic probes 317 different from each other. That is, the concentration detection unit 30 has the GFETs 311 including a plurality of organic probes 317. A bonding property and bond strength of the organic probe 317 with respect to the molecule to be detected 2 differ depending on types of the organic probes 317, and a signal change amount of the GFET 311 with respect to a concentration of the molecule to be detected 2 also thereby differs depending on the types of the organic probes 317.

For example, as illustrated in FIG. 9, even in a case of detecting the same molecule to be detected 2, an output signal value of the GFET 311 and a rate of concentration change in the output signal value sometimes differ depending on the types of the organic probes 317. Furthermore, as comparing FIG. 9 and FIG. 10, even in the GFETs 311 using the same organic probes 317, an output signal value of the GFET 311 and a rate of concentration change in the output signal value sometimes differ depending on types of the molecules to be detected 2. Accordingly, the rate of concentration change in the output signal value according to each of the molecules to be detected 2 in the plurality of concentration detection cells 301, 301 is found in advance, and based on discrimination result of the molecule to be detected 2 with the type discrimination unit 20, by selecting the concentration detection cell 301 having a large rate of concentration change in the output signal value with respect to the discriminated molecule to be detected 2, accuracy for the concentration of the molecule to be detected 2 can be increased.

To the type discrimination and concentration calculation unit 40 of the second embodiment, a detection signal is sent from each of the plurality of type detection cells 201 of the type detection unit 20. These detection signals are individually compared with signal values of the MOFs 214 stored in a storage unit to discriminate the type (molecular type) of the molecule to be detected 2. In discriminating the type of the molecule to be detected 2, depending on in which type detection cell 201 the fluorescence property of the MOF 214 reacts with the molecule to be detected 2, the discrimination accuracy for the type of the molecule to be detected 2 can be increased. Further, when the MOFs 214 of the plurality of type detection cells 201, 201 react with the molecule to be detected 2, by comparing patterns of detection signals caused by the reaction with patterns of signal values of the MOFs 214 stored in the storage unit, the discrimination accuracy for the type of the molecule to be detected 2 can be increased.

Next, based on the discrimination result of the type of the molecule to be detected 2, by selecting the concentration detection cell 301 having a large rate of concentration change of an output signal with respect to the discriminated molecule to be detected 2 among the GFETs 311 of the concentration detection cells 301, 301, and converting an output signal value of the GFET 311 of the selected concentration detection cell 301 into a concentration, the concentration of the molecule to be detected 2 is calculated. On this occasion, as illustrated in FIG. 9 and FIG. 10, since an output signal of the GFET 311 of each of the concentration detection cells 301, 301 differs depending on the molecules to be detected 2, the concentration detection cell 301 is selected according to the discriminated molecule to be detected 2. Thus, selecting the concentration detection cell 301 having a large rate of concentration change of an output signal according to the discriminated molecule to be detected 2 and calculating a concentration from an output signal value of the GFET 311 corresponding to the molecule to be detected 2 allow an increase in the accuracy for the concentration of the molecule to be detected 2.

EXAMPLE

Next, specific examples and evaluation results thereof are described.

Example 1

First, a type detection sensor having a MOF is produced as follows. In a $N_2$ glove box, 20 mg of the MOF is weighed to put it in a petri dish made of Teflon, 180 mg of single-component condensation-type silicone (manufactured by Momentive Performance Materials Inc., TN3305) is added thereto, and the mixture is mixed quickly with a dispensing spoon so that the whole becomes uniformly milk white. A Teflon film having a thickness of about 80 μm with a 10 mm diameter circular hole open is used as a mask, and the above-described MOF-dispersed silicone is applied and molded to/on a 15 mm squire quartz substrate. Thereafter, the resultant is taken out of the glove box and cured at room temperature in the air for three days. After a MOF dispersed silicone film is completely cured, the mask is taken off, and low-molecular components inside a MOF-silicone hybrid film are eluted by one-hour immersion in methanol. After this, three-hour vacuum drying with heating to 120° C. leads to initialization.

Figure 6:
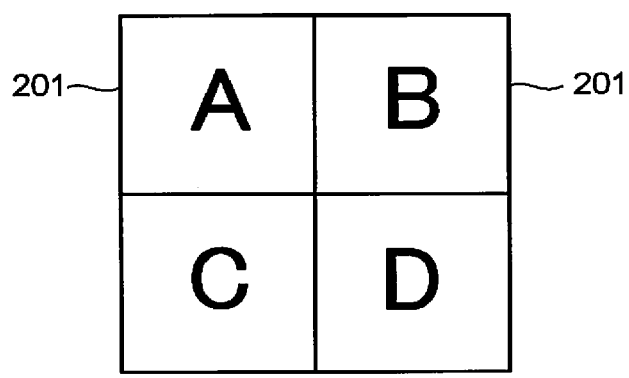
FIG. 6 is a view illustrating an example of detection cells of the type detection unit illustrated in FIG. 4.

In Example 1, as illustrated in FIG. 6, a type detection unit 20 having four type detection cells A to D is prepared. MOFs different in type from each other are applied to these four type detection cells A to D. Accordingly, since the type detection cells A to D differ in interaction with a gas molecule to be detected depending on the types of the MOFs, a fluorescence spectrum changes depending on the type of the gas molecule to be detected. The type detection unit 20 uses an UV-LED having a center wavelength of 300 nm and an optical fiber having UV resistance as a light source 221, and further, uses an UV-transmission visible light-cut filter which transmits a wavelength of 380 nm or less and cuts a wavelength of 380 nm or more, and is formed so that a phosphor layer is uniformly irradiated with UV light via a light diffusing plate. A light receiver 222 also uses the same optical fiber as that of the light source 221 and is formed so as to receive fluorescence from the MOFs and output detection signals.

Next, a detection element in which a GEFT and an organic probe are combined is prepared as follows. First, graphene is formed on a surface of a copper foil by CVD (Chemical Vapor Deposition) with flowing of a gas containing a hydrocarbon-based substance such as methane under the condition of about 1000° C. Next, a polymethyl methacrylate film is applied at 4000 rpm by a spin coating method, and the opposite surface of the copper foil is etched with an ammonium persulfate solution of 0.1 M, and thereby a graphene film floating in the solution is recovered. By doing this, the graphene is transferred onto the polymethyl methacrylate film side.

A surface of the graphene is sufficiently cleaned, and thereafter this is transferred again onto a silicon substrate having a $SiO_2$ film formed on a surface thereof. After the redundant polymethyl methacrylate film is removed, a resist is applied onto the graphene transferred onto the silicon substrate to undergo patterning, and an electrode pattern is formed by oxygen plasma. Electrode materials are vapor-deposited so as to obtain a source-drain interval of 10 nm, thereby forming a FET structure having a source electrode and a drain electrode. Thus, the graphene is disposed on an oxidized film formed on the surface of the silicon substrate, and a sensor structure having a back gate GFET is formed in which the graphene is sandwiched between the source electrode and the drain electrode and the silicon substrate side is set as a gate electrode.

Figure 8:
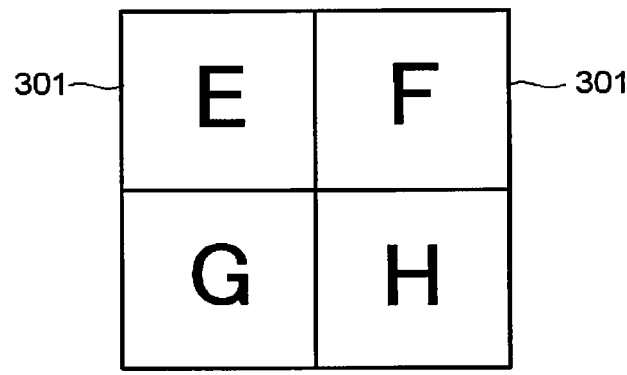
FIG. 8 is a view illustrating an example of detection cells of the concentration detection unit illustrated in FIG. 5.

Next, an organic probe is provided on the surface of the graphene. The organic probe is installed in a manner that an organic compound is dissolved in a methanol solution in a concentration of 10 nM and a graphene sensor surface is immersed in the resultant solution for several minutes. In Example 1, as illustrated in FIG. 8, a concentration detection unit 30 having four concentration detection cells E to H is prepared. Organic probes different in type from each other are installed on GFETs of these four concentration detection cells E to H. Accordingly, the concentration detection cells E to H differ in bond strength with a gas molecule to be detected depending on types of organic compounds forming the organic probes. The above-described four type detection cells A to D having the MOFs and the four concentration detection cells E to H having the GFETs including the organic probes are covered with a chamber, thereby forming a detection apparatus.

As the gas molecule to be detected, 2,4-dinitrotoluene (DNT) is used. DNT is yellow crystals, and its melting point is 71.4° C., its decomposition temperature is 300° C., and its vapor pressure is $3.51\times10^{-2}$ Pa (25° C.). DNT is solid at normal temperatures, but vaporizes in about 300 ppb at normal temperatures. In Example 1, this saturated vapor is introduced into the chamber covering the type detection cells A to D and the concentration detection cells E to H to perform detection and concentration measurement of DNT.

Before and after the introduction of DNT, fluorescence emitted from a phosphor layer is converted into an electrical signal, which undergoes signal processing for reducing noise and is recorded as a time change of fluorescence intensity in PC. As a result, the molecule to be detected is discriminated to be DNT by comparison with signal strength patterns illustrated in FIG. 7. Further, before and after the introduction of DNT, with respect to the GFET of each of the concentration detection cells E to H, time responses of a drain current in sweeping a back gate voltage between −100 and +100 V under a constant drain voltage and a drain current under a constant drain voltage and a constant back gate voltage are measured. Based on the above-described discrimination results of DNT, the cell E having a large correlation between a DNT concentration and an output signal illustrated in FIG. 9 is selected. Based on the correlation between the DNT concentration and the output signal in the cell E, a concentration of DNT is found from a detection signal of the DNT in the cell E. Thus, it is possible to perform discrimination and calculation of a concentration of the DNT as the molecule to be detected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The inventions described in the accompanying claims and their equivalents are intended to cover such forms or modifications as would fall within the scope and spirit of the inventions.

What is claimed is:

1. A molecular detection apparatus, comprising:
   a first detector that includes a first sensor including a phosphor layer containing a metal organic framework having a fluorescence emitting property, a light source to irradiate the metal organic framework with light, and a light receiver to receive fluorescence from the metal organic framework, the first detector being configured to measure a fluorescence property of the metal organic framework, which changes according to molecules to be detected;
   a second detector that includes a second sensor having a sensor layer and electrodes electrically connected with the sensor layer, the second detector being configured to measure an electric property of the sensor layer, which changes according to the molecules; and
   circuitry configured to receive measurement results transmitted by the first detector and the second detector, determine a type of the molecules by the measurement result of the first detector, and calculate a concentration of the molecules by the measurement result of the second detector, wherein
   the circuitry is further configured to determine the type of the molecules by the fluorescence property measured with the first detector, and calculate the concentration of the molecules by the electric property measured with the second detector.

2. The apparatus according to claim 1, wherein the second detector comprises the second sensor, which includes a field effect transistor having a graphene layer as the sensor layer, and is configured to measure an electric property of the graphene layer, which changes according to the molecules.

3. The apparatus according to claim 2, wherein the second sensor has organic probes, which are provided on the graphene layer and capture the molecules.

4. The apparatus according to claim 3, wherein the second detector includes a plurality of the second sensors, and the plurality of second sensors have the organic probes, which are different in type from each other.

5. The apparatus according to claim 1, wherein the first detector includes a plurality of the first sensors, and the second detector includes a plurality of the second sensors.

6. The apparatus according to claim 5, wherein the plurality of first sensors include a plurality of metal organic frameworks, wherein the plurality of metal organic frameworks provided in the plurality of first sensors are different in type from each other.

7. The apparatus according to claim 5, wherein the circuitry is further configured to select a specific second sensor among the plurality of second sensors based on the determined type of molecules, and calculate the concentration of the molecules by a measurement result of the selected second sensor.

8. The apparatus according to claim 1, further comprising a collector configured to collect a detection target gas containing the molecules.

9. The molecular detection apparatus of claim 1 wherein the circuitry is configured to calculate and determine the concentration of the molecules using information obtained from both the first and second sensors.

10. A molecular detection method, comprising:
    introducing molecules to be detected to a first sensor of a first detector including a phosphor layer containing a metal organic framework having a fluorescence emitting property, irradiating the metal organic framework with light after the molecules are introduced, and receiving a fluorescence from the metal organic framework, to measure a fluorescence property of the metal organic framework, which changes according to the molecules;
    introducing the molecules to a second sensor of a second detector having a sensor layer and electrodes electrically connected with the sensor layer, to measure an electric property of the sensor layer, which changes according to the molecules;
    determining a type of the molecules by a measurement result of the fluorescence property measured with the first detector; and
    after determining the type of the molecules, calculating a concentration of the molecules by a measurement result of the electric property measured with the second detector, based on the determined type of molecules.

11. The method according to claim 10,
    wherein the second sensor includes a field effect transistor having a graphene layer as the sensor layer, and
    wherein the second detector measures an electric property of the graphene layer, which changes according to the molecules.

12. The method according to claim 11, wherein the second sensor has an organic probe, which is provided on the graphene layer and captures the molecules.

13. The method according to claim 10, wherein the molecules are introduced to a plurality of the first sensors, and the molecules are introduced to a plurality of the second sensors.

14. The method according to claim 13, wherein the plurality of first sensors include a plurality of metal organic frameworks, wherein the plurality of the metal organic frameworks provided in the plurality of first sensors are different in type from each other.

15. The method according to claim 13, wherein
the plurality of second sensors have organic probes different in type from each other.

16. The method according to claim 13, wherein the calculating step comprises selecting a specific second sensor among the plurality of second sensors based on the determined type of molecules, and calculating the concentration of the molecules by a measurement result of the selected second sensor.

17. A molecular detection apparatus, comprising:
a first detector that includes a first sensor including a phosphor layer emitting a fluorescence when light is irradiated and containing a metal organic framework having a fluorescence emitting property, a light source to irradiate the metal organic framework with light, and a light receiver to receive fluorescence from the metal organic framework, the first detector being configured to measure a fluorescence property of the metal organic framework, which changes according to molecules to be detected;
a second detector that includes a second sensor having a sensor layer and electrodes electrically connected with the sensor layer, the second detector being configured to measure an electric property of the sensor layer, which changes according to the molecules; and
circuitry configured to receive measurement results transmitted by the first detector and the second detector, determine a type of the molecules by the measurement result of the first detector, and calculate a concentration of the molecules by the measurement result of the second detector, wherein
the circuitry is further configured to determine the type of the molecules by the fluorescence property measured with the first detector, and calculate the concentration of the molecules by the electric property measured with the second detector.

* * * * *